US012586897B2

(12) United States Patent
Molisch et al.

(10) Patent No.: US 12,586,897 B2
(45) Date of Patent: Mar. 24, 2026

(54) SPINNING DIRECTIONAL ANTENNA IN CENTIMETER AND MILLIMETER WAVE BANDS

(71) Applicant: UNIVERSITY OF SOUTHERN CALIFORNIA, Los Angeles, CA (US)

(72) Inventors: Andreas Molisch, Los Angeles, CA (US); Christoph Mecklenbraeuker, Vienna (AT); Thomas Pohl, Vienna (AT); Hussein Hammoud, Los Angeles, CA (US); Yuning Zhang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 18/272,468

(22) PCT Filed: Jan. 14, 2022

(86) PCT No.: PCT/US2022/012559
§ 371 (c)(1),
(2) Date: Jul. 14, 2023

(87) PCT Pub. No.: WO2022/155493
PCT Pub. Date: Jul. 21, 2022

(65) Prior Publication Data

US 2024/0079771 A1 Mar. 7, 2024

Related U.S. Application Data

(60) Provisional application No. 63/137,320, filed on Jan. 14, 2021.

(51) Int. Cl.
*H01Q 3/20* (2006.01)
*H01Q 19/10* (2006.01)
(Continued)

(52) U.S. Cl.
CPC ............ *H01Q 3/20* (2013.01); *H01Q 19/104* (2013.01); *H01Q 19/06* (2013.01)

(58) Field of Classification Search
CPC .. H01Q 3/20; H01Q 3/16; H01Q 3/12; H01Q 19/132; H01Q 19/192; H01Q 19/18;
(Continued)

(56) References Cited

U.S. PATENT DOCUMENTS 5,526,008 A 6/1996 Meserole et al.
5,534,874 A 7/1996 Yujiri et al.
(Continued)

FOREIGN PATENT DOCUMENTS

| | | | |
|---|---|---|---|
| CN | 109888471 | A | 6/2019 |
| KR | 100679571 | B1 | 2/2007 |
| KR | 20090053618 | A | 5/2009 |

OTHER PUBLICATIONS

Int'l Search Report & Written Opinion dtd May 2, 2022 for PCT Appn. No. PCT/US2022/012559, 9 pgs.
(Continued)

*Primary Examiner* — Dameon E Levi
*Assistant Examiner* — Gurbir Singh
(74) *Attorney, Agent, or Firm* — Brooks Kushman P.C.

(57) ABSTRACT

A redirecting rotating mirror arrangement includes a directional antenna subcomponent having a direction of maximum received or transmitted beam intensity. The redirecting rotating mirror arrangement also includes a rotatable mirror that reflects an electromagnetic beam to or from the directional antenna subcomponent. The rotatable mirror is inclined at an inclination angle with respect to a horizontal plane. The arrangement also includes a motor that rotates the rotatable mirror about the direction of maximum received or transmitted beam intensity such that the electromagnetic
(Continued)

beam is either received from or transmitted to a range of angles as the rotatable mirror rotates.

21 Claims, 7 Drawing Sheets

(51) Int. Cl.
*H01Q 19/06* (2006.01)
*H01Q 19/13* (2006.01)

(58) Field of Classification Search
CPC ...... H01Q 19/104; H01Q 9/10; H01Q 21/061; H01Q 1/288
See application file for complete search history.

(56) References Cited

U.S. PATENT DOCUMENTS

| | | | | |
|---|---|---|---|---|
| 6,043,788 | A * | 3/2000 | Seavey | H01Q 3/20 343/781 CA |
| 9,728,861 | B2 | 8/2017 | Tanabe | |
| 2016/0315392 | A1* | 10/2016 | Tanabe | H01Q 3/20 |
| 2018/0054294 | A1 | 2/2018 | Rappaport et al. | |

OTHER PUBLICATIONS

European Search Report dated Nov. 25, 2024 for EP Appn. No. 22740162.7, 10 pgs.

* cited by examiner

SPINNING DIRECTIONAL ANTENNA IN CENTIMETER AND MILLIMETER WAVE BANDS

CROSS-REFERENCE TO RELATED APPLICATIONS

This application is the U.S. national phase of PCT Appln. No. PCT/US2022/012559 filed Jan. 14, 2022, which claims the benefit of U.S. provisional application Ser. No. 63/137,320 filed Jan. 14, 2021, the disclosure of which is hereby incorporated in its entirety by reference herein.

STATEMENT REGARDING FEDERALLY SPONSORED RESEARCH OR DEVELOPMENT

This invention was made with government support under 69A3551747109 awarded by the U.S. Department of Transportation. The government has certain rights in the invention.

TECHNICAL FIELD

In at least one aspect, a directional antenna system includes a spinning mirror directing radiation over a range of angles.

BACKGROUND

The measurement of wireless propagation channels is a fundamental requirement for both the design of wireless systems and their deployment. In particular, for systems operating at high frequencies (e.g., mm-wave and THz frequency bands), the directionally resolved characteristics are critically important. Moreover, such characteristics include the double-directional impulse response as defined by [Steinbauer et al. 2001], describing the directions of arrival and directional of departure, as well as delays and amplitudes of the multipath components. Measurements of the double-directional characteristics are done at the high frequencies in one of two ways: (i) measurement with an antenna array, such as a phased array, or (ii) measurements with rotating directional antennas. In the latter case, highly directional antennas (e.g., a horn, lens, or parabolic antenna) at the Tx and another at the Rx are utilized. Then let the Tx antenna point in an (approximately) fixed direction. The Rx antenna is then moved to point into different directions (where the direction can change either in steps or continuously), recording the channel impulse response or equivalent for each horn direction. The Tx antenna is then moved to a different transmit direction, with the Rx antenna again sweeping through its orientations, and so on. The process is repeated until impulse responses for a full set of Tx-Rx direction combinations have been measured. This second method is very popular because it requires only a single Tx and Rx, with the Tx consisting of the waveform generator, upconverter, and Rx horn antenna, and similarly for the Rx. In contrast, for an array approach, either a phased array or a set of antenna elements with multiple up/down converters is required.

However, a major drawback of the rotating horn approach is the slow measurement speed. Typically, precision rotors (similar to stepper motors) are used, and it may take several seconds for the rotation to be finished and any vibrations of the start/stop operation to settle. As a consequence, the total time for measuring all Tx/Rx combinations may be on the order of tens of minutes. This leads to two major drawbacks: (i) it is not possible to perform dynamic measurements because dynamics, e.g., of a pedestrian or car passing by, changing the environment to be measured faster than the time it takes to measure the channel, and (ii) even when the environment is static, the number of Tx and Rx locations at which measurements can be done is limited, because each measurement at each location takes 10 minutes or more.

Furthermore, the measuring of signals at different times from different directions (or transmission of the signal at different times,) into different directions, is important not only for the determination of propagation channel properties, but can also be required in the operation of a wireless system, e.g., in the broadcasting of information to users in different directions. The benefit of using horn antennas pointing into different directions (as opposed to transmitting with an omni-directional antenna) are an enhanced signal-to-noise ratio, as well as the possibility for the receiving device to determine the direction of the transmission from the timing of the received signal (and vice versa). Similar to the channel measurement problem, the slow speed of a rotating horn is a major obstacle in practical use.

One now might think about simply speeding up the rotation of the horns. However, this faces two main obstacles: (i) a horn is an asymmetric (around the feed point) load, and very fast rotations would be mechanically problematic. (ii) more importantly, at high speeds, it is not possible to rotate the horn 360 degrees into one direction, stop, and rotate back. Rather, a continuous rotation is required, which means that the horn must be fed through a rotary joint that is aligned with the axis of rotation. Yet, at high frequencies, these joints are expensive and have a finite lifetime; they would break after just a few hours of measurement when stressed with high-speed rotation.

Accordingly, there is a need for improved rotatable antenna assemblies.

SUMMARY

In at least one aspect, problems of the prior art are avoided by providing a redirecting rotating mirror arrangement that decouples sensitive RF components, including feedlines, from the actual rotating devices, by a redirecting rotating mirror arrangement (ReRoMA) as shown in FIG. 1. The foregoing summary is illustrative only and is not intended to be in any way limiting. In addition to the illustrative aspects, embodiments, and features described above, further aspects, embodiments, and features will become apparent by reference to the drawings and the following detailed description.

In another aspect, a redirecting rotating mirror arrangement is provided. The redirecting rotating mirror arrangement includes a directional antenna subcomponent having a direction of maximum received or transmitted beam intensity. The redirecting rotating mirror arrangement includes a rotatable mirror that reflects an electromagnetic beam to or from the directional antenna subcomponent. The reflection of the beam by the mirror may make it advantageous that the polarization of the incident beam is circular, combined with a polarization-switching mechanism on at least one of the Radio-Frequency ends to account for the polarization direction changing at every reflection. The rotatable mirror is inclined at an inclination angle with respect to a horizontal plane. The arrangement also includes a motor that rotates the rotatable mirror about the direction of maximum received or transmitted beam intensity such that the electromagnetic beam is either received from or transmitted to a range of angles as the rotatable mirror rotates.

In another aspect, a system having at least one redirecting rotating mirror arrangement is provided. The system includes an electromagnetic transmitter, a first antenna subassembly in electrical communication with the electromagnetic transmitter, an electromagnetic receiver, and a second antenna subassembly in electrical communication with the electromagnetic receiver. Characteristically, at least one of the first antenna subassembly or the second antenna subassembly is a redirecting rotating mirror arrangement as set forth herein.

In another aspect, a method implemented by the redirecting rotating mirror arrangements and systems set forth herein is provided. The method includes a step of reflecting an electromagnetic beam by a rotatable mirror. The rotatable mirror is inclined at an inclination angle with respect to a direction of maximum beam intensity of the electromagnetic beam. Characteristically, the electromagnetic beam is reflected to a directional antenna subcomponent or reflected from the directional antenna subcomponent. The rotatable mirror is rotated about the direction of maximum beam intensity of the electromagnetic beam such that the electromagnetic beam is either received from or transmitted to a range of angles as the rotatable mirror rotates.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
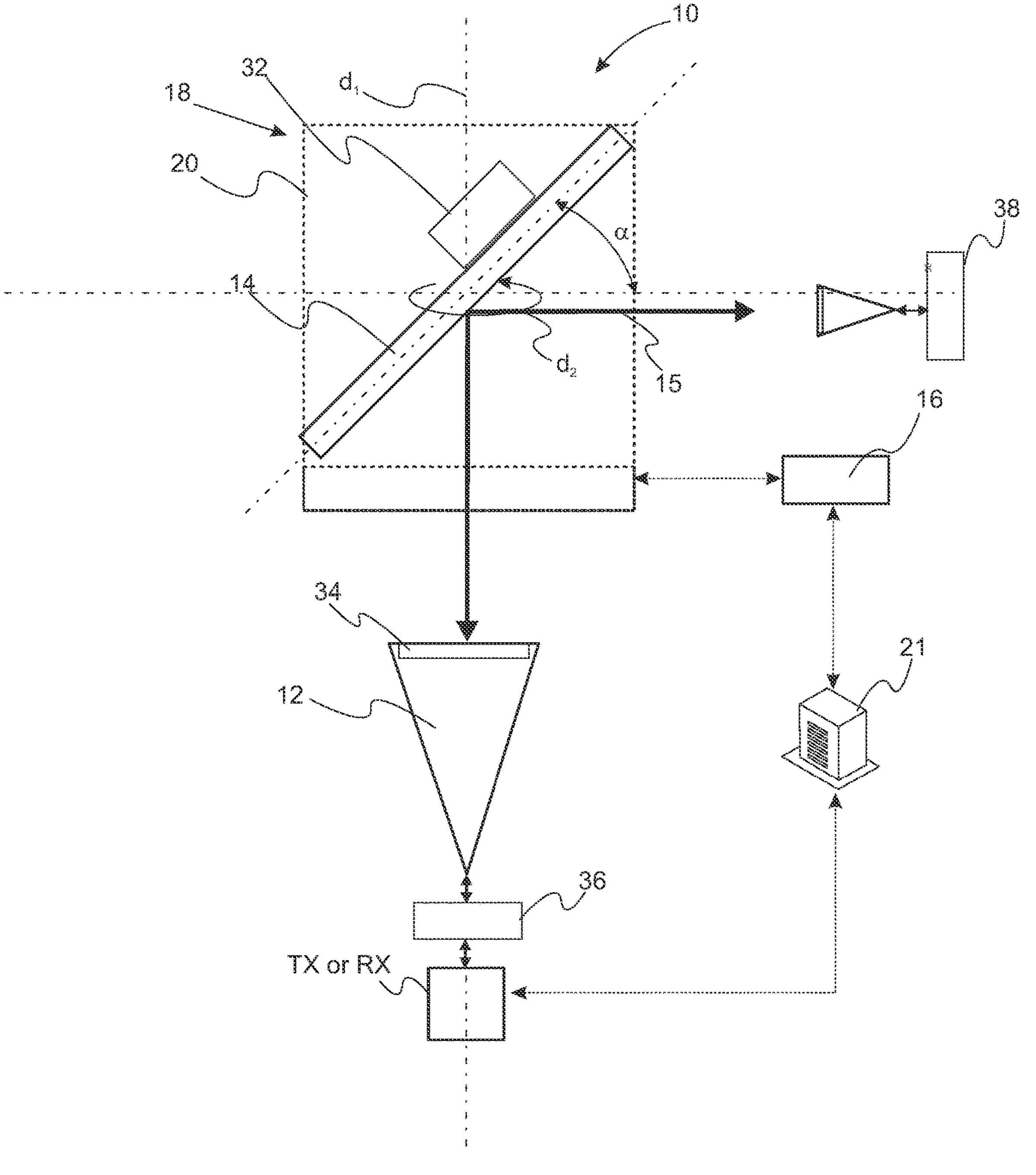
FIG. 1A. Schematic of a redirecting rotating mirror arrangement with antenna positioned vertically.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

In the context of electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Throughout this application, where publications are referenced, the disclosures of these publications in their entireties are hereby incorporated by reference into this application to more fully describe the state of the art to which this invention pertains.

Abbreviations

"MIMO" means multiple-input and multiple-output.

"ReRoMA" means redirecting rotating mirror arrangement.

"Rx" means receiver.

"SIMO" means single-input and multiple-output.

"Tx" means transmitter.

In general, redirecting rotating mirror arrangements and systems are provided. The redirecting rotating mirror arrangements and systems implement methods that include a step of reflecting an electromagnetic beam by a rotatable mirror. The rotatable mirror is inclined at an inclination angle with respect to a direction of maximum beam intensity of the electromagnetic beam. Characteristically, the electromagnetic beam is reflected to a directional antenna subcomponent or reflected from the directional antenna subcomponent. The rotatable mirror is rotated about the direction of maximum beam intensity of the electromagnetic beam such that the electromagnetic beam is either received from or transmitted to a range of angles as the rotatable mirror rotates. Advantageously, the redirecting rotating mirror arrangement and systems thereof can be configured for measurement of propagation channel characteristics and/or configured for directional reception and transmission.

Figure 1B:
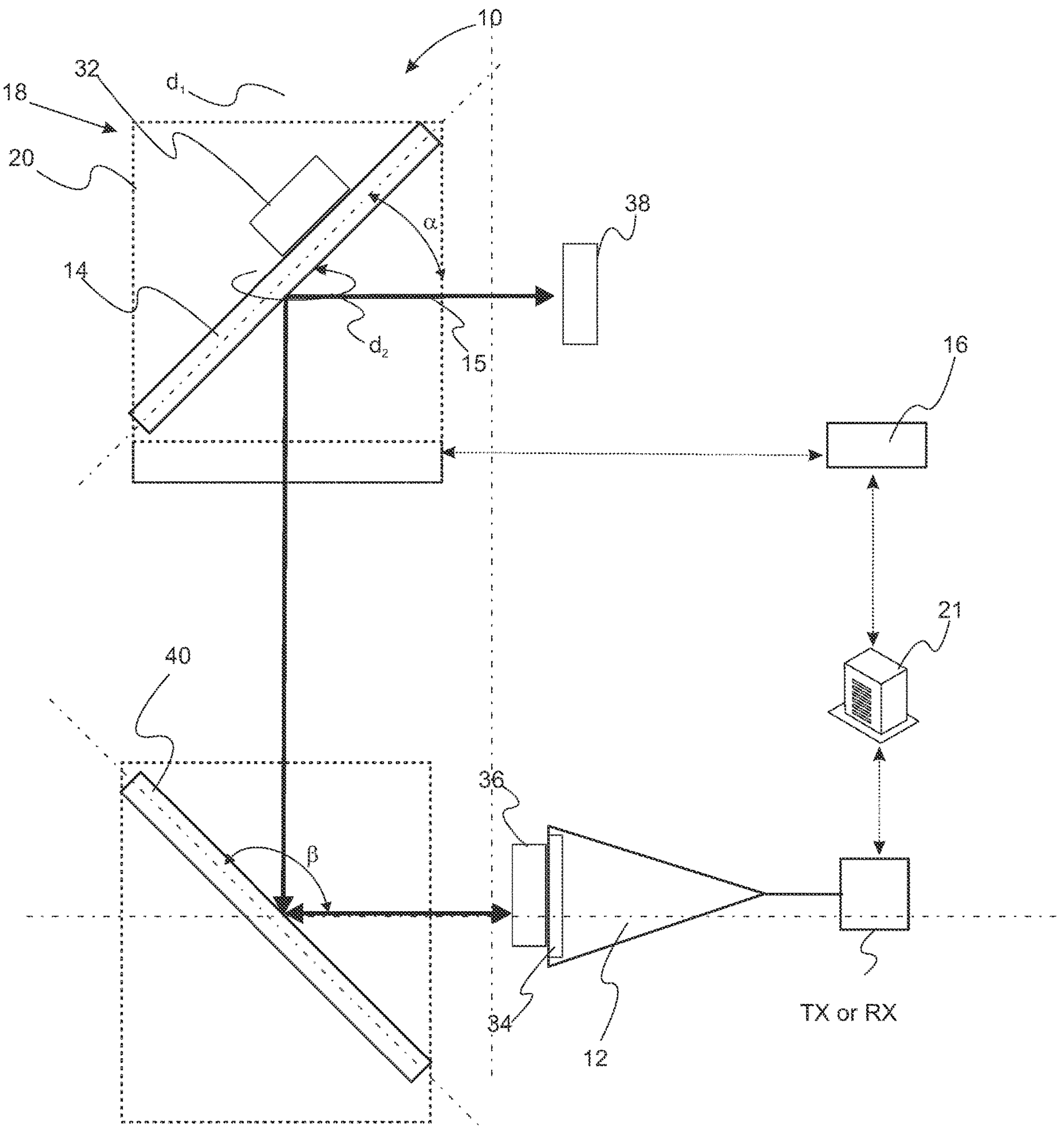
FIG. 1B. Schematic of a redirecting rotating mirror arrangement with antenna positioned horizontally.
Figure 2:
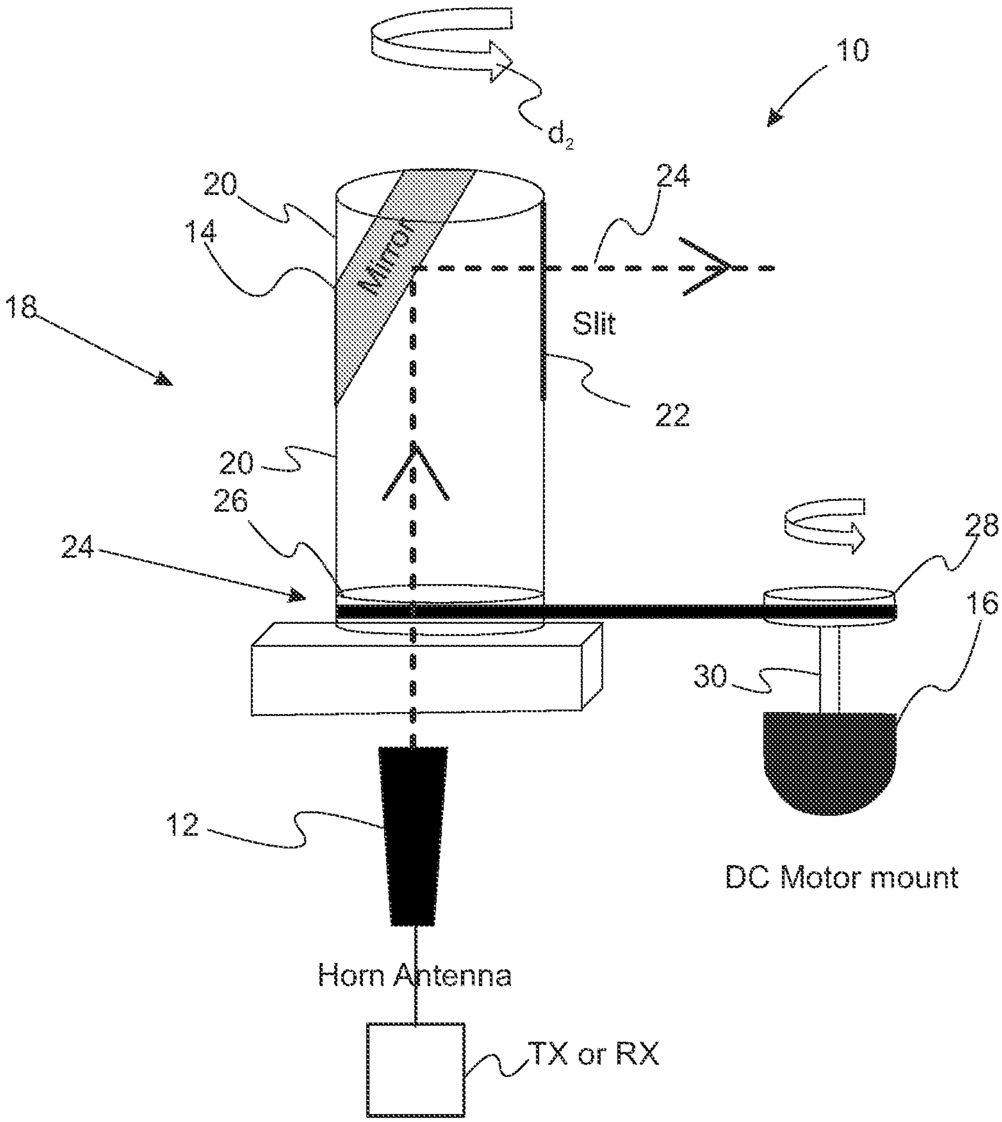
FIG. 2. Schematic of a redirecting rotating mirror arrangement with a rotatable mirror placed in a tube.

As depicted in FIGS. 1A, 1B, and 2, a schematic of a redirecting rotating mirror arrangement for directional antenna systems is provided. Redirecting rotating mirror arrangement 10 includes a directional antenna subcomponent 12 having a direction $d_1$ of maximum received or transmitted beam intensity. Rotatable mirror 14 reflects electromagnetic beam 15 to or from the directional antenna subcomponent. Rotatable mirror 14 is inclined at an inclination angle $\alpha$ with respect to a predetermined plane. In a refinement, the inclination angle $\alpha$ is from about 30 to 60 degrees (e.g., about 45 degrees) relative to this predetermined plane. In one refinement, this predetermined plane is perpendicular to the direction $d_1$ of maximum received (e.g., reflected) or transmitted beam intensity. In another refinement, the horizontal plane is parallel to the ground. When $\alpha$ is 45 degrees, an electromagnetic beam will sweep through the horizontal plane. In a further refinement, the inclination of the mirror can be made adjustable through mechanical system 32, e.g., screws pushing the top of the mirror up/down, or by electrically controlled mechanical or piezo-mechanical elements. Therefore, mechanical system 32 can be attached to mirror holder 20.

Still referring to FIGS. 1 and 2, redirecting rotating mirror arrangement 10 includes mirror assembly 18 that includes a mirror holder 20, which holds rotatable mirror 14. Mirror holder 20 can be of any mechanical design that allows a signal to enter and exit. An example of such a design is a hollow rotatable tube with one or more openings (e.g., slits). Motor 16 rotates mirror assembly 18 and therefore rotatable mirror 14. In a refinement, belt system 24 is used to rotate the mirror assemble. In this regard, pully 26 is attached to mirror holder 20 while pulling 28 is in mechanical communication with motor 16 via shaft 30. The rotatable mirror 14 rotates along direction $d_2$ which is around the direction $d_1$ of maximum received (e.g., reflected) or transmitted beam intensity such that electromagnetic radiation is either received from or transmitted to a range of angles as the rotatable mirror rotates. Advantageously, the directional antenna subcomponent 12 (e.g., a horn antenna), the cables, EM components, etc. are stationery, without any rotating movement. In a refinement, the directional antenna subcomponent 12 points upwards with respect to the ground.

Referring to FIG. 1B, directional antenna subcomponent 12 can be angled with respect to a horizontal plane that is parallel to the ground. In some variation, second mirror 40 directs an electromagnetic signal from rotatable mirror 14 to directional antenna subcomponent 40. The face of mirror 40 is oriented with an angle $\beta$ with respect to a horizontal plane relative to ground. Typically angle $\beta$ is from about 80 degrees to about 170 degrees. In a refinement, the directional antenna subcomponent 12 points horizontally with respect to the ground) emitting its beam into a mirror 40 with an inclination $\beta$, similar to a periscope design. As set forth above, Characteristically, the transmitted EM waves are then redirected by rotatable mirror 14.

In one refinement, the directional antenna subcomponent 12 is a horn antenna with or without a dielectric lens 34. In other refinements, the directional antenna subcomponent is a parabolic antenna, a helical antenna, a patch antenna, loop antenna, or a yagi antenna. In a further refinement, a lens may be placed at any place in the path of the beam, e.g. after (in the transmit case) the mirror.

Referring to FIG. 1, redirecting rotating mirror arrangement 10 can include one or more of polarization switches 36 and 38. In one refinement, a first polarization switch placed at the electromagnetic transmitter passes electromagnetic signal with polarization that depends on the settings of the switch. In another refinement, a second polarization switch placed at the receiver passes electromagnetic radiation with polarization that depends on the settings of the switch.

In a variation, redirecting rotating mirror arrangement 10 can include computing device 21 that can control motor 16. In a refinement, computing device 21 can receive and store signals from the transmitter or receiver.

In some variations, redirecting rotating mirror arrangement 10 can be used at one link end (e.g., transmitter Tx or receiver Rx) alone if directionally resolved measurement is required only at that end. Alternatively, redirecting rotating mirror arrangement, 10 can be used at both link ends. Therefore, in one refinement, a transmitter of electric communications or radar signals Tx is in electrical communication with directional antenna subcomponent 12. In another refinement, receiver Rx of electric communications or radar signals is in electrical communication with directional antenna subcomponent 12. In the variation having redirecting rotating mirror arrangements at both ends, the rotation speeds of the Tx and Rx should be adjusted in such a way that all combinations of Tx and Rx angles of observation (with a resolution of at least half the beamwidth of the antennas) can be observed. This can be achieved, e.g., by having the ReRoMA at the Tx rotate significantly slower than that at the RX, so that the TX antenna rotates through less than a beamwidth while the RX ReRoMA performs a full rotation. Alternative arrangements, where the Tx and Rx directions are sampled irregularly, following, e.g., the principles of [Wang et al. 2018], can be considered as well. Other alternative arrangements, where Tx and Rx are sampled regularly, but their rotation speeds are different in such a way that samples cover all combinations of Tx and Rx directions, can be considered as well.

The polarization of the feeding horn is, in principle, arbitrary. However, it is advantageous to use circular polarization for the excitation, since for all other polarization states from the horn, the polarization state of the redirected wave changes as a function of the mirror orientation. In the case of using circular polarization, it is advantageous to use a polarization switch, switching the handedness of the circular polarization between left and right. This is due to the fact that a reflection of an incident beam with circular polarization will flip its handedness. Such a polarization switch can be implemented at one link end only, or at both link ends. When exciting only one circular polarization, both signal echoes suffering even, and signal echoes suffering odd number of reflections, can be received, but the strength of the arriving signal is particular to the exciting polarization handedness. Exciting both polarization directions at Tx and receiving both at the Rx would therefore provide a full description for the channel. While circular polarization is the preferred polarization mode, the use of other polarizations is possible as well In many applications it is important to know the direction in which the signal is transmitted for the Tx and Rx. For this purpose, the ReRoMA requires precise readings of the rotation angles that need to be synchronized to the signals.

Conversely, the transmission/reception of signals can be triggered by the antenna rotating through particular angles. In the former case, one example implementation is the use of a photoelectric sensor placed in a fixed position relative to the antenna, with some sort of reflecting object (e.g., a piece of reflective tape) or an active light source taped on the rotating tube 18, or with reflective markings, e.g., etched onto the tube. In case the reflective tape is used, a polarized reflective tape can be used in this case to reduce the sensitivity to the ambient daylight. The estimation of the angular direction can be made more involved and accurate by making a more sophisticated design of the reflective tape pattern. For example, the length of the reflective tape and the length of the non-reflective surface can be varied, thereby creating a clear pattern that can be used to know exactly what position we are pointed to by just observing the pattern of the photoelectric sensor readings. Alternatively, an optical angular encoder can also be used in place of the photoelectric sensor setup to get accurate angular measurements that will be corresponded to channel readings after capture.

No matter what angular direction estimation method is used, an accurate sampling with a sufficiently-high sampling rate (that depends on the rotating speed) can be performed using computing device 21 of FIG. 1. For example, such sampling can be performed either using a microcontroller setup (e.g., FPGA, Arduino, RaspberryPi, etc.), or a digitizer board (possibly as part of a larger setup e.g., an NI DAQ board). The trigger signal to be used for sampling this data has to be synchronized with the signal that will be used for the capturing of the RF signal, to make a clear correspondence between the angular position of the tube and the response that the antenna can observe while sending/receiving the beam from that specific direction.

Figure 3:
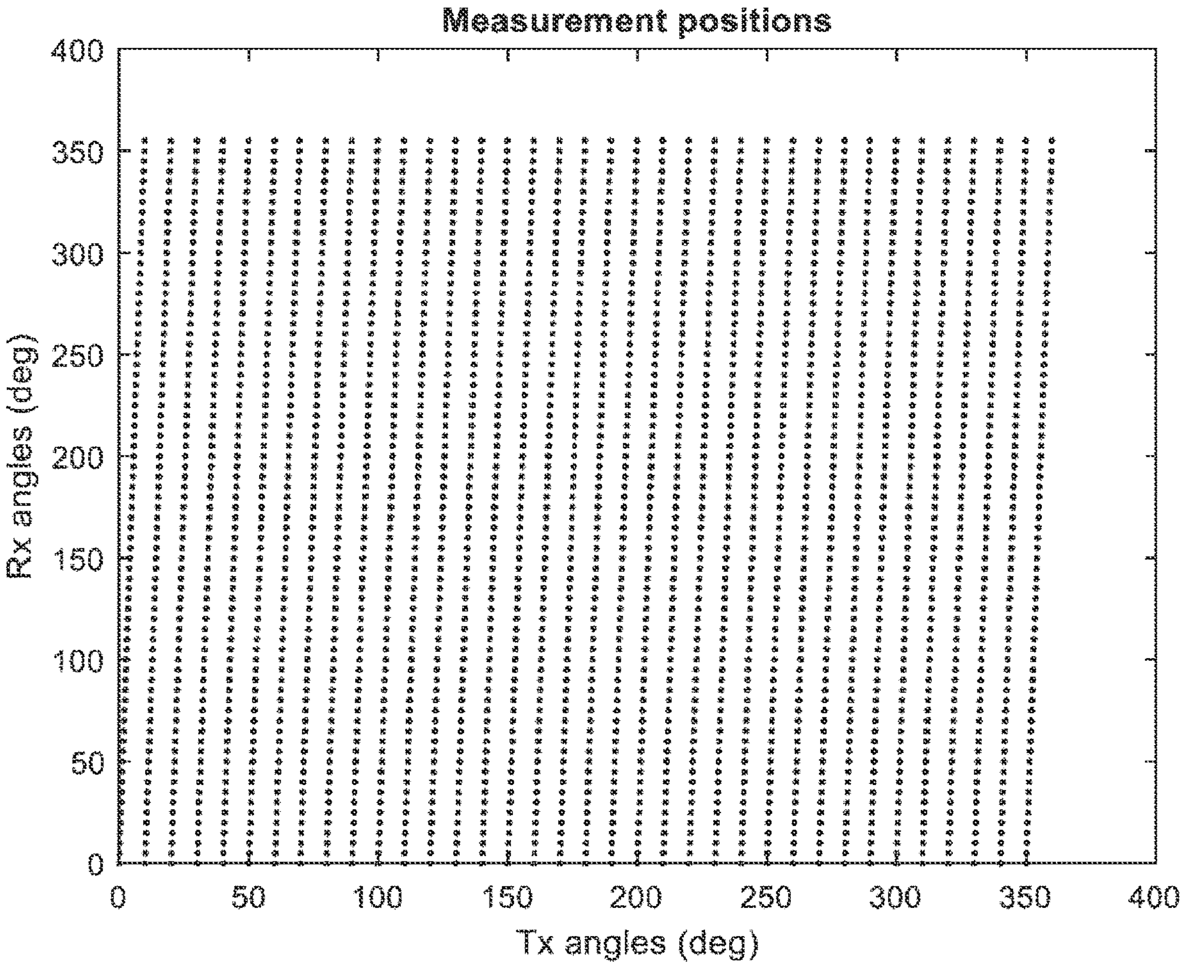
FIG. 3. Plots of Rx angles versus Tx angles for full MIMO sampling of the channel.

The order in which the channel between the Tx and the Rx is being scanned should also be considered. In traditional directionally resolved channel sounders, whether using a full antenna array or a rotating horn using a stepper motor, the Tx antenna is in a fixed position while the RX is doing a full sweep of the Rx directions before moving to the next Tx direction and so on. The difference in this setup is that while the Rx is doing a full angular rotation, the Tx does not stop. Instead, it keeps on rotating but at a slower pace. Therefore, instead of having a full SIMO snapshot at the following angles (Tx, Rx)=($\alpha$, $\theta_1$), ($\alpha$, $\theta_2$), ($\alpha$, $\theta_3$), ($\alpha$, $\theta_4$), . . . . ($\alpha$, $\theta_N$) for N positions at the Rx, we get the following angles (Tx, Rx)=($\alpha$, $\theta_1$), ($\alpha+\Delta$, $\theta_2$), ($\alpha+2\Delta$, $\theta_4$), . . . ($\alpha+(N-1)\Delta$, $\theta_N$), where N is the total positions at the Rx and $\Delta$ is the step movement at the Tx while the Rx is moving from a position to the next one. Taking that into consideration, FIG. 3 provides plots of Rx angles versus Tx angles for full MIMO sampling of the channel. Moreover, this has to be accounted for during the post-processing of the data, and interpolation must be done to estimate how would the "rectangular" sampling of the channel look like. Additionally, due to possible variation in the speed of the rotation on either (or both) Tx and Rx, the actual Rx angles versus Tx angles for a full MIMO sampling of the channel might lie on an irregular grid. Established methods for estimating continuous functions (or sampled functions at arbitrary sampling times or angles) from a non-uniform set of measured samples can be employed to handle such interpolation.

FIG. 2 depicts an example implementation for the system for azimuthal channel scanning, which is schematically depicted. In this variation, rotatable mirror 14 is located in tube 20, having slit 22 that is rotated at high speed. Thus, EM beam 24 is directed into (or received from) different directions as time goes on. Since none of the components in the rotating tube are mechanically connected to RF, no wear on any RF connectors occurs. The mirror and associated components can be designed in such a way that is provides the desired beam characteristics in the intended plane of observation. Often that will mean that the beam emanating from the redirecting rotating mirror arrangement 10 should not be broadened significantly compared to the beamwidth of the horn feeding the arrangement. In the variation depicted in FIG. 2, motor 16 is a DC motor controlling a belt that is responsible for the rotation of the tube 20. In a refinement, this belt-driven system can be replaced with any transmission structure, including but not limited to a set of gears, a propeller shaft, even with a gear box or a clutch. To rotation can also be driven by the motor directly via an axle without any other transmission structure. FIG. 2 also shows the mirror situated at an angle of 45 degrees which reflects the beam emitted by the horn antenna into the slit of the tube.

Figure 4:
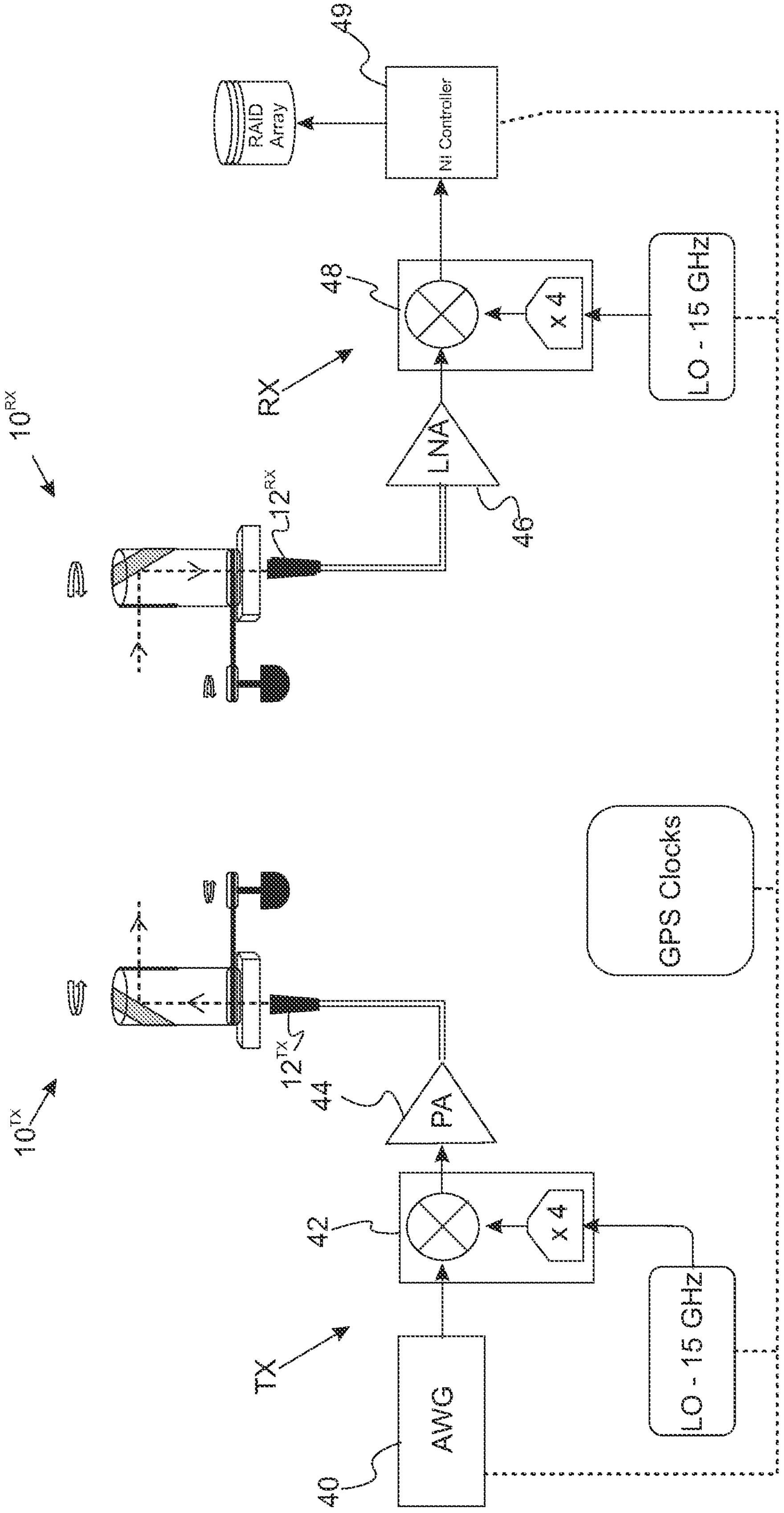
FIG. 4. Schematic of a system having a redirecting rotating mirror arrangement at two ends of a link.

The structure of FIG. 2 can be mapped to our system (by which we mean an example implementation that we have realized in hardware) as seen in the diagram of FIG. 4. This design includes redirecting rotating mirror arrangement $\mathbf{10}^{TX}$ on the transmitter side and a redirecting rotating mirror arrangement $\mathbf{10}^{RX}$ on the receiving side. Both rotating mirror arrangement $\mathbf{10}^{TX}$ and rotating mirror arrangement $\mathbf{10}^{RX}$ are of the redirecting rotating mirror arrangement designs described above in FIGS. 1 and 2 and associated description. In the transmitting side, a waveform generated from an arbitrary waveform generator (AWG) gets upconverted into a 60 GHz carrier with up-frequency converter 42. The electromagnetic signal is amplified with amplifier 44 then transmitted through an antenna $\mathbf{14}^{TX}$. A similar structure is used on the receiving side, a directional antenna captures $\mathbf{14}^{RM}$ the signal, passes it through an amplification stage with amplifier 46, then down conversion with down converter 48. Signal sampler 49 can be used to acquire and digitize the signal which is then registered by the digitizer system into a raid array for later processing.

Figure 5:
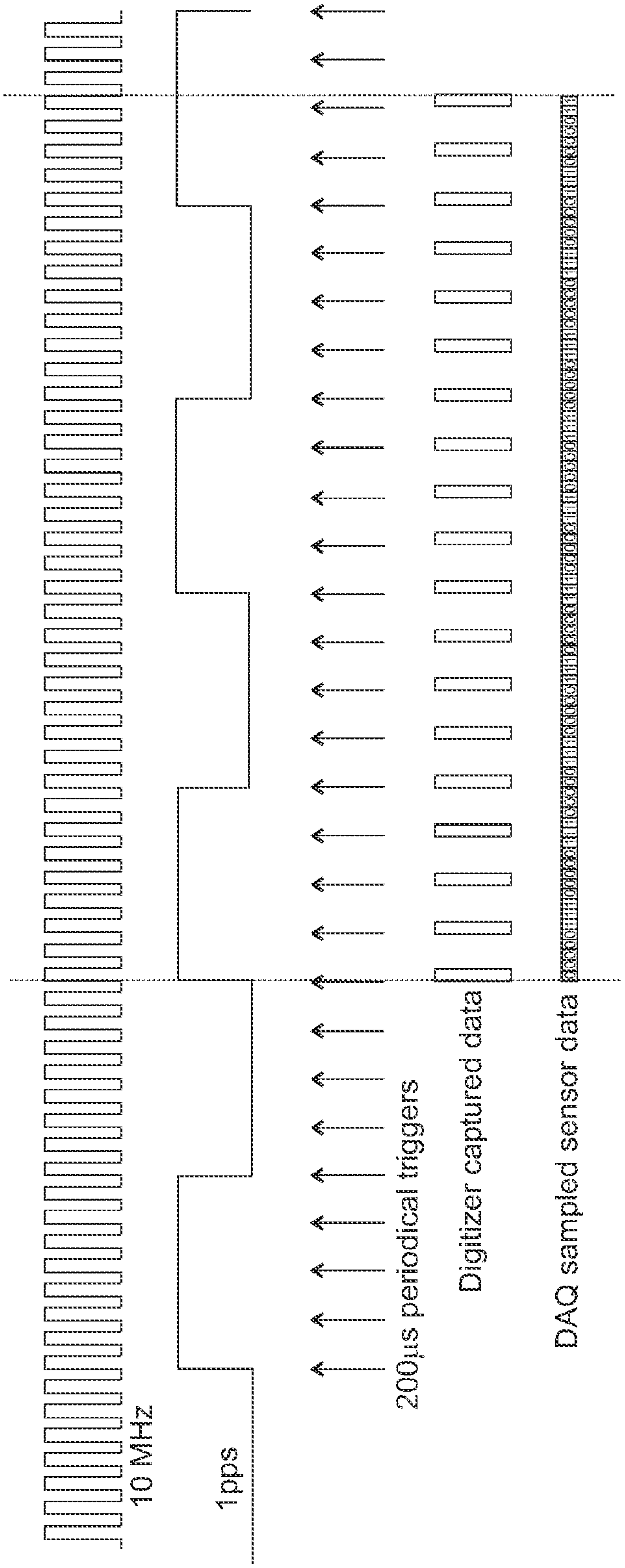
FIG. 5. Time-diagram showing how a 200 us trigger was created using the 10 MHz reference, how the capture on both the digitizer and the DAQ were initiated using the 1 pps (only once), and how the subsequent triggering was done using the 200 μs trigger.

Still referring to FIG. 4, triggering of the capture for both digitizer and angular recording systems can be accomplished using the 1 pps and the 10 MHz reference signals generated by the GPS-disciplined clocks, as used in our example implementation. The 1 pps serves as an initial trigger for the full process, and is only observed once at the start to trigger both the digitizer capture and the sensor data capture. All subsequent triggers are done using the 10 MHz signal, or a signal that was generated using the 10 MHz as reference. Generally speaking, the trigger period should be dependent on the number of antenna positions to be captured on the Rx, and the speed of rotation of the Rx motor. In our example implementation, we choose 200 us as our trigger period, which is generated by counting the corresponding number of pulses from the 10 MHz reference. This is what is shown in the time-diagram of FIG. 5, without reflecting the actual real ratios of course. We show how the 200 us trigger was created using the 10 MHz reference, how the capture on both the digitizer and the DAQ was initiated using the 1 pps (only once), and how the subsequent triggering was done using the 200 μs trigger.

The example implementation above states how signals from GPS-disciplined clocks can be used to trigger the measurement. Another possible implementation would be to use the pulses generated by the angular encoder/sensor as a direct trigger for the capture. Such a method would require an extra calibration, which would try to compensate for the delay introduced by the system between the actual trigger (arrival at a position in the angular domain) vs. the instant when the digitizer starts the capture. Such delay needs to be accounted for because it will be used to correct for the correspondence between the captured data and the angle in which the slit was pointing at.

In a variation, another needed calibration is the calibration for the full setup. While a back-to-back calibration is known for standard setups, the calibration for this one differs. Since we have added the ReRoMA into the setup, the calibration needs to be done for every rotation angle of the slit, with an angular step width that is at most equal to half the beamwidth of the horn antenna.

Figure 6:
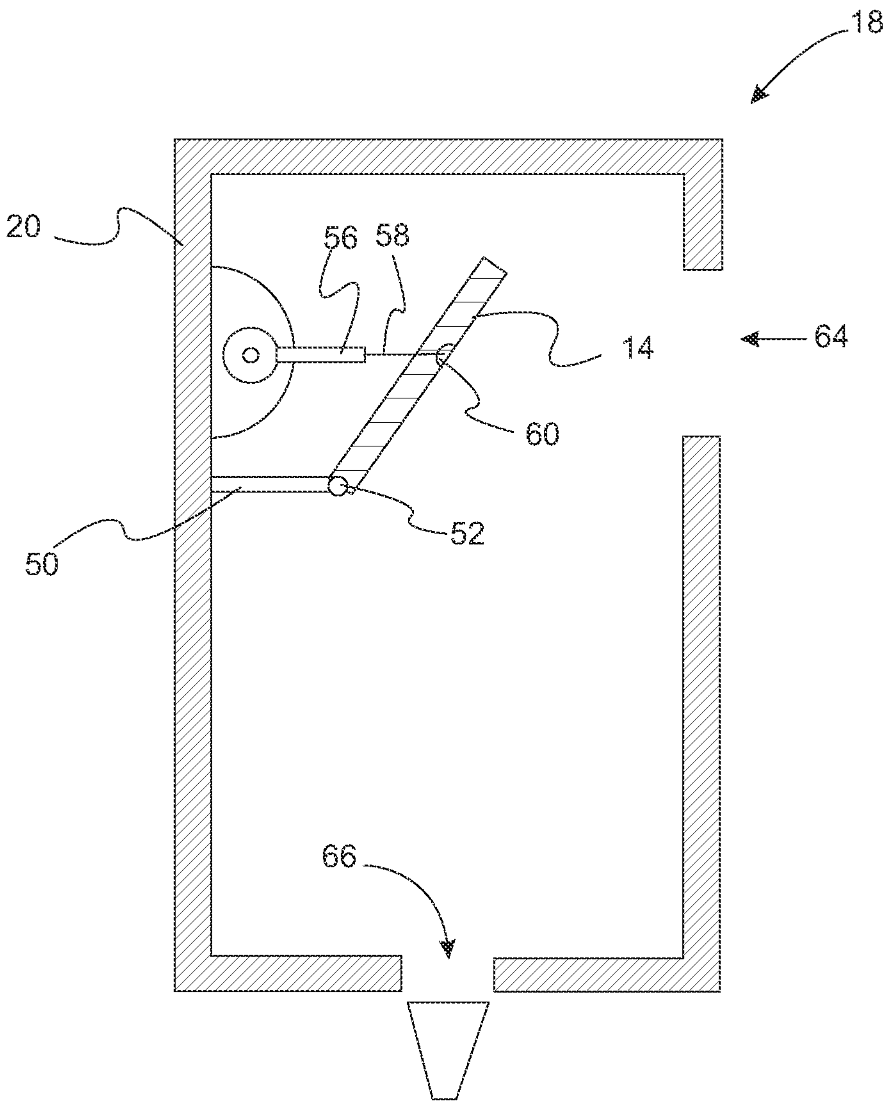
FIG. 6. Schematic showing mechanically controls the angle of the mirror.

The description set forth above has been directed to the estimation and the scanning of the channel in the azimuthal domain. If an elevation domain scanning is needed, it can be done by adjusting the position of the mirror, increasing/decreasing the angle between the mirror and the structure to scan different elevation directions. This can be automated as a part of the system by scanning full azimuth for a certain elevation angle, then mechanically control the angle of the mirror to change to a different elevation direction and scan the full azimuth plane again, and proceed in such pattern until the elevation directions of interest are swept through. Such mechanical control of the mirror angle can be done by the use of an actuator for example. A diagram showing an example implementation is shown FIG. 6. This implementation can be useful to mimic a scenario where one of the ends is a base station, typically with a downward tilt, but also can be generalized for any possible application where we are not only interested in the azimuthal cut. In this variation, mirror assembly 18 includes rotatable mirror 14 pivotably attached to mirror holder 20 via attachment member 50 and joint. Mechanical actuator 56 (e.g., a linear actuator) is configured to move attachment member 58 which is attached to joint 60. FIG. 6 also depicts openings 64 and 66 that let a signal into and out of sample holder 20.

In a refinement, multiple elevation angles can be excited simultaneously by means of multi-layer mirrors, where each layer can reflect the beam into a different elevation angle. In a further refinement, an oddly-shaped mirror can be used, centered with respect to the incident beam, reflecting one part of the beam into a certain elevation angle and the other part of the beam into a different elevation angle. Such simultaneous excitation methods can be used on either (or both) Tx and Rx. It is advantageous to use at the Tx while stepping through different elevations on the Rx.

For the RF head, which includes the amplifier, the antenna, and the reflective mirror and the tube/tunnel, all of these structure can also be installed/attached to an electrical or manual movement arm holding structure, which can adjust the height level of our structure, hence allowing the azimuthal/elevation scanning of the channel at different heights. Such arm holding structure can either be controlled by a computer, or some other electrical programmable controller, or powered by an electrical drill-like device or can be even be manually adjusted by hand, with or without ruled scale, either by hand directly, or through a levered crank structure.

It should be appreciated that the above device can be used not only for measurement of propagation channel characteristics but generally for directional reception and transmission. For example, a Tx can broadcast, with full antenna gain, a repeated signal into different directions, or an Rx can receive with full antenna gain from a sequence of directions, and through the synchronization, determine which communication signal it is obtaining from a particular direction. Furthermore, applications in imaging are similarly doable. It is stressed again that the two key advantages compared to phased arrays are (i) much lower cost, in particular at high carrier frequencies, and (ii) availability at frequencies at which phased arrays simply are not available.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

Steinbauer, M., Molisch, A. F. and Bonek, E., 2001. The double-directional radio channel. *IEEE Antennas and propagation Magazine,* 43(4), pp. 51-63.

Wang, R., Renaudin, O., Bas, C. U., Sangodoyin, S. and Molisch, A. F., 2019. On channel sounding with switched arrays in fast time-varying channels. *IEEE Transactions on Wireless Communications,* 18(8), pp. 3843-3855.

What is claimed is:

1. A redirecting rotating mirror arrangement comprising:

a directional antenna subcomponent having a direction of maximum received or transmitted beam intensity;

a rotatable mirror that reflects an electromagnetic beam to or from the directional antenna subcomponent, the rotatable mirror inclined at an inclination angle with respect to the direction of maximum received or transmitted beam intensity; and a motor that rotates the rotatable mirror about the direction of maximum received or transmitted beam intensity such that electromagnetic beam is either received from or transmitted to a range of angles as the rotatable mirror rotates; and a tube into which the rotatable mirror is positioned, the tube being rotated by the motor, the tube having a slit for passing the electromagnetic beam.

2. The redirecting rotating mirror arrangement of claim 1, wherein the directional antenna subcomponent is a horn antenna with or without a dielectric lens.

3. The redirecting rotating mirror arrangement of claim 1, wherein the directional antenna subcomponent is a parabolic antenna, a helical antenna, or a yagi antenna.

4. The redirecting rotating mirror arrangement of claim 1, wherein an electromagnetic transmitter is in electrical communication with the directional antenna subcomponent.

5. The redirecting rotating mirror arrangement of claim 1, wherein an electromagnetic receiver in electrical communication with the directional antenna subcomponent.

6. The redirecting rotating mirror arrangement of claim 1, wherein the inclination angle is from about 30 to 60 degrees.

7. The redirecting rotating mirror arrangement of claim 1, wherein the inclination angle is about 45 degrees.

8. The redirecting rotating mirror arrangement of claim 1, further comprising a tube into which the rotatable mirror is positioned, the tube being rotated by the motor, the tube having a slit for passing the electromagnetic beam.

9. The redirecting rotating mirror arrangement of claim 1 configured for measurement of propagation channel characteristics selected from double-directional impulse response, directions of arrival, directions of departure, delays of multipath components, and amplitudes of multipath components.

10. The redirecting rotating mirror arrangement of claim 1 configured for directional reception and transmission.

11. The redirecting rotating mirror arrangement of claim 1, further comprising a mechanical actuator that changes the inclination angle.

12. A system comprising:

an electromagnetic transmitter;

a first antenna subassembly in electrical communication with the electromagnetic transmitter;

an electromagnetic receiver;

a second antenna subassembly in electrical communication with the electromagnetic receiver, wherein at least one of the first antenna subassembly or the second antenna subassembly is a redirecting rotating mirror arrangement that includes:

a directional antenna subcomponent having a direction of maximum received or transmitted beam intensity;

a rotatable mirror that reflects an electromagnetic beam to or from the directional antenna subcomponent, the rotatable mirror inclined at an inclination angle with respect to the direction of maximum received or transmitted beam intensity; and a motor that rotates the rotatable mirror about the direction of maximum received or transmitted beam intensity such that electromagnetic beam is either received from or transmitted to a range of angles as the rotatable mirror rotates; and a tube into which the rotatable mirror is positioned, the tube being rotated by the motor, the tube having a slit for passing the electromagnetic beam.

13. The system of claim 12 wherein the first antenna subassembly and the second antenna subassembly are each independently a redirecting rotating mirror arrangement.

14. The system of claim 12 further comprising a first polarization switch placed at the electromagnetic transmitter that passes electromagnetic signal with a polarization that depends on settings of the first polarization switch.

15. The system of claim 12 further comprising a second polarization switch placed at the electromagnetic receiver that passes electromagnetic radiation with a polarization that depends on settings of the second polarization switch.

16. The system of claim 12, wherein the directional antenna subcomponent is a horn antenna with or without a dielectric lens.

17. The system of claim 12, wherein the directional antenna subcomponent is a parabolic antenna, a helical antenna, or a yagi antenna.

18. The system of claim 12, wherein the electromagnetic transmitter in electrical communication with the directional antenna subcomponent.

19. The system of claim 12, wherein the electromagnetic receiver in electrical communication with the directional antenna subcomponent.

20. The system of claim 12, further comprising a tube into which the rotatable mirror is positioned, the tube being rotated by the motor, the tube having a slit for passing the electromagnetic beam.

21. A method comprising:

reflecting an electromagnetic beam by a rotatable mirror, the rotatable mirror inclined at an inclination angle with respect to a direction of maximum beam intensity of the electromagnetic beam, wherein the electromagnetic beam is reflected to a directional antenna subcomponent or reflected from the directional antenna subcomponent; and rotating the rotatable mirror about the direction of maximum beam intensity of the electromagnetic beam such that electromagnetic beam is either received from or transmitted to a range of angles as the rotatable mirror rotates utilizing a tube into which the rotatable mirror is positioned, the tube being rotated by a motor, the tube having a slit for passing the electromagnetic beam.

* * * * *